United States Patent
Wang et al.

(10) Patent No.: US 10,324,208 B2
(45) Date of Patent: Jun. 18, 2019

(54) PREMIGRATION DEGHOSTING FOR MARINE STREAMER DATA USING A BOOTSTRAP APPROACH IN TAU-P DOMAIN

(71) Applicant: CGG SERVICES SA, Massy (FR)

(72) Inventors: Ping Wang, Sugar Land, TX (US); Suryadeep Ray, Houston, TX (US); Can Peng, Fulshear, TX (US); Yunfeng Li, Sugar Land, TX (US)

(73) Assignee: CGG SERVICES SAS, Massy (FR)

( * ) Notice: Subject to any disclaimer, the term of this patent is extended or adjusted under 35 U.S.C. 154(b) by 351 days.

(21) Appl. No.: 14/759,960

(22) PCT Filed: Jan. 13, 2014

(86) PCT No.: PCT/EP2014/050485
§ 371 (c)(1),
(2) Date: Jul. 9, 2015

(87) PCT Pub. No.: WO2014/108536
PCT Pub. Date: Jul. 17, 2014

(65) Prior Publication Data
US 2015/0355357 A1     Dec. 10, 2015

Related U.S. Application Data

(60) Provisional application No. 61/751,553, filed on Jan. 11, 2013.

(51) Int. Cl.
*G01V 1/36* (2006.01)

(52) U.S. Cl.
CPC ...... *G01V 1/364* (2013.01); *G01V 2210/1293* (2013.01); *G01V 2210/1423* (2013.01);
(Continued)

(58) Field of Classification Search
CPC .................................................. G01V 2210/56
See application file for complete search history.

(56) References Cited

U.S. PATENT DOCUMENTS 6,832,161 B1   12/2004  Moore
9,234,977 B2 *  1/2016  Ferber .................... G01V 1/364
(Continued)

FOREIGN PATENT DOCUMENTS

EP        2395374 A1    12/2011

OTHER PUBLICATIONS

Examination Report in corresponding Australian Application No. 2014204760 dated Feb. 22, 2017. (Both references D1 and D2 were previously made of record in an Information Disclosure Statement submitted Jul. 9, 2015.).
(Continued)

*Primary Examiner* — Yu-Hsi D Sun
(74) *Attorney, Agent, or Firm* — Patent Porfolio Builders PLLC

(57) ABSTRACT

Methods and systems for optimized receiver-based ghost filter generation are described. The optimized ghost filter self-determines its parameters based on an iterative calculation of recorded data transformed from a time-space domain to a Tau-P domain. An initial ghost filter prediction is made based on generating mirror data from the recorded data and using a least squares technique during a premigration stage.

20 Claims, 9 Drawing Sheets

(52) U.S. Cl.
CPC ...... *G01V 2210/52* (2013.01); *G01V 2210/56* (2013.01); *G01V 2210/671* (2013.01)

(56) References Cited

U.S. PATENT DOCUMENTS

| | | | | |
|---|---|---|---|---|
| 9,632,194 | B2* | 4/2017 | Vassallo | G01V 1/303 |
| 2016/0084977 | A1* | 3/2016 | Rickett | G01V 1/364 |
| | | | | 702/17 |

OTHER PUBLICATIONS

Carlson et al., "Increased resolution and penetration from a towed duel-sensor streamer," First Break, Dec. 2007, vol. 25.
Ebrom et al., "Facilitating technologies for permanently instrumented oil fields," The Leading Edge, Mar. 2000.
Fokkema et al., "Seismic Applications of Acoustic Reciprocity," Jan. 1993, Elsevier Science Publishers B.V., Amsterdam, The Netherlands.
Gratacos, "Over-Under Deghosting: 1D, 2D, or 3D algorithms in the F, FK, or FXY domains," 2008 SEG Annual Meeting, Conference Paper, Nov. 9-14, 2008, Las Vegas, NV, USA.
Ozdemir et al., "Optimized deghosting of over/under towed-streamer data in the presence of noise," The Leading Edge, Feb. 2008.
Posthumus, "Deghosting Using a Twin Streamer Configuration," Geophysical Prospecting, Apr. 1993, pp. 267-286, vol. 41, No. 3.
Riyanti et al., "Pressure wave-field deghosting for non-horizontal streamers," 2008 SEG Annual Meeting, Conference Paper, Nov. 9-14, 2008, Las Vegas, NV, USA.
Soubaras, "Deghosting by joint deconvolution of a migration and a mirror migration," SEG Technical Program Expanded Abstracts, 2010, pp. 3406-3410.
Wang et al., "Premigration deghosting for marine towed streamer data using a bootstrap approach," SEG Technical Program Expanded Abstracts, SEG Annual Meeting 2012, Nov. 4-9, 2012, Las Vegas, NV, USA.
Written Opinion of the International Searching Authority and International Search Report dated Jul. 8, 2014 in related International Application No. PCT/EP2014/050485.
Mexican Official Action, dated Nov. 15, 2018, for Mexican Application No. MX/a/2015/008979, with a partial English translation. (All of the references cited in the Mexican Official Action are already of record.).
Office Action in Mexico Application No. MX/2018/48414 dated Jun. 14, 2018.
Wang, P., et al.; "Premigration deghosting for marine towed streamer data using a bootstrap approach"; SEG Las Vegas 2012 Annual Meeting; XP-002726285; Nov. 4-9, 2012; pp. 1-5.

* cited by examiner

PREMIGRATION DEGHOSTING FOR MARINE STREAMER DATA USING A BOOTSTRAP APPROACH IN TAU-P DOMAIN

RELATED APPLICATIONS

The present application is the National Stage of International Application No. PCT/EP2014/050485, filed Jan. 13, 2014, which claims priority and benefit from U.S. Provisional Patent Application No. 61/751,553, filed Jan. 11, 2013, entitled "Premigration Deghosting for Marine Streamer Data Using a Bootstrap Approach in Tau-P Domain," to Ping Wang, Suryadeep Ray, Can Peng and Yunfeng Li, the disclosure of which is incorporated herein by reference.

TECHNICAL FIELD

Embodiments of the subject matter disclosed herein generally relate to methods and systems for seismic data processing and, more particularly, to mechanisms and techniques for generating optimized receiver-based ghost filters.

BACKGROUND

Seismic data acquisition and processing techniques are used to generate a profile (image) of a geophysical structure (subsurface) of the strata underlying the land surface or seafloor. Among other things, seismic data acquisition involves the generation of acoustic waves and the collection of reflected/refracted versions of those acoustic waves to generate the image. This image does not necessarily provide an accurate location for oil and gas reservoirs, but it may suggest, to those trained in the field, the presence or absence of oil and/or gas reservoirs. Thus, providing an improved image of the subsurface in a shorter period of time is an ongoing process in the field of seismic surveying.

A significant problem in marine-based seismic data analysis is receiver ghosts. In marine-based seismic data acquisition, the up-going acoustic waves reflected from subsurface reflectors are first recorded by the receivers. Next, the acoustic waves continue to propagate to the surface where they are reflected back down and are recorded again by the receivers as ghosts. The reflectivity at the free surface is close to negative one and based on this property, the down-going acoustic waves have similar amplitudes as the previously described up-going acoustic waves but have an opposite polarity. Accordingly, some of the frequencies in the recorded acoustic wave data are attenuated near the ghost notches and the removal of the receiver ghosts can provide the benefit of infilling the ghost notches and providing higher quality images in terms of frequency band and signal-to-noise ratio.

Removing receiver ghost before data migration has proven advantageous because it provides better low frequency and high frequency response as well as a higher signal-to-noise ratio for preprocessing steps, e.g., multiple suppression and velocity analysis. In one attempt to remove receiver ghosts, associated with receivers maintained at a constant depth, the ghost removal has been carried out in the frequency/wavenumber (FK) domain but limitations such as requiring a constant depth for the receivers and being limited to 2D for high frequencies due to coarse sampling in crossline direction. For an example, please refer to J. T. Fokkema and P. M. van den Berg in their 1993 article entitled "Seismic Applications of Acoustic Reciprocity" published by Elsevier and incorporated herein by reference.

In another attempt to remove receiver ghosts associated with non-horizontal receiver based seismic data, a method was presented by C. D. Riyanti, R. G. Van Borselen, P. M. van den Berg and J. T. Fokkema in their 2008 article entitled "Pressure Wavefield Deghosting for Non-horizontal Streamers," published in the 78th Meeting, SEG, Expanded Abstracts, pages 2652-2656 and incorporated herein by reference. The presented method was capable of handling variable-depth receivers as long as their depths were accurately known, but as above, could handle only two-dimensional data because the method worked in the FK domain.

A further attempt to remove receiver ghosts includes a method using both pressure wavefields and velocity wavefields to attenuate the receiver ghosts. In this method the particle velocity is measured in the vertical direction of the wave propagation. In essence, the upward moving waves detected by the geophones and hydrophones are in phase and the downward moving reflections, i.e., the receiver ghosts, are one hundred eighty degrees out of phase so that summing the two recorded datasets can attenuate the receiver ghost. Unfortunately, difficulties arise in calibrating the difference between the two datasets because of low signal-to-noise ratio for particle velocity data and emergence-angle variations. This method is described in more detail in a 2007 article by D. A. Carlson, W. Long, H. Tobti, R. Tenghamn and N. Lunde entitled "Increased resolution and Penetration from a Towed Dual-Sensor Streamer," published in First Break, 25, pages 71-77 and incorporated herein by reference.

Other attempts have been made to remove receiver ghosts, for example, the interested reader is referred to B. J. Postumus who authored a 1993 article entitled "Deghosting Using a Twin Streamer Configuration," published in Geophysical Prospecting, 41, pages 267-286 for concurrently towed shallow and deep streamers, and enhancements to this method by A. Özdemir, P. Caprioli, A. Özbek, E. Kragh and J. Robertsson for their 2008 article entitled "Optimized Deghosting of Over/Under Towed-Streamer Data in the Presence of Noise," published in The Leading Edge, 27, page 90 for an optimal deghosting approach in the FK domain to jointly deghost the shallow depth data and the deep depth data and by B. Gratacos for the 2008 article entitled "Over/Under Deghosting: 1D, 2D or 3D Algorithms in the F, FK or FXY Domains," published in the 78th Meeting, SEG, Expanded Abstracts, pages 125-129 to obtain an upward direction wavefield. Unfortunately, this method and its enhancements suffer collectively from sparse crossline sampling and require accurate receiver positioning, not easily accomplished, for high frequencies.

In another attempt to improve variable depth deghosting associated with both shot and receiver ghosts that works for both NAZ and WAZ geometries, the interested reader is referred to a P. Wang and C. Peng and their 2012 article entitled "Premigration Deghosting for Marine Towed Streamer Data Using a Bootstrap Approach," published in the 82nd Meeting, SEG, Expanded Abstracts, pages 1-5. However, this method becomes less accurate when the variation of emergence angles is large in a given space-time domain window, e.g., at shallow large offsets where different arrivals converge.

Accordingly, it would be desirable to provide systems and methods that avoid the afore-described problems and drawbacks.

SUMMARY

According to an exemplary embodiment, a method, stored in a memory and executing on a processor, for generating an optimized receiver-based ghost filter from recorded data comprises generating mirror data from said recorded data; transforming said recorded data and said mirror data from a time-space domain to a Tau-P domain and dividing into a plurality of Tau-P domain data windows; generating a ghost delay time for each of said plurality of Tau-P windows; generating frequency-slowness (f-p) domain primaries based on reghosted and inverse Tau-P transformed said f-p domain primaries equaling said recorded data; generating frequency-space (f-x) domain primaries based on applying an inverse Tau-P transform to said f-p domain primaries; and generating said deghosted recorded data based on an inverse Fourier transform of said f-x domain primaries.

According to another exemplary embodiment, a node for generating ghost-free receiver-based seismic data comprises recorded seismic data; one or more processors configured to execute computer instructions and a memory configured to store the computer instructions wherein the computer instructions further comprises a mirror data component for generating mirror data of the recorded data; an engine component for transforming said recorded data and said mirror data from a time-space domain to a Tau-P domain, from a Tau-P domain to a frequency-slowness domain, from a frequency-slowness domain to time-space domain and for adding a phase coefficient to correct for time differences between transformed recorded data and transformed mirror data; a ghost filter component for generating an optimized ghost filter based on predicting an initial ghost filter and optimizing the initial ghost filter based on minimizing a ghost filter delay time associated with the transformed recorded data; and an output component for outputting the ghost-free receiver-based seismic data.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of generating seismic illumination data ghost filters and generating maps of seismic illumination during marine acquisition. However, the embodiments to be discussed next are not limited to these configurations, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to various embodiments described herein, methods and systems for generating (computing) seismic illumination data ghost filters are presented which, for example, self-determine their parameters for receiver deghosting, associated with a seismic data analysis, and further combine anti-leakage tau-p transforms to better handle large variations of emergence angles. Such methods and systems can, for example, be used in the pre-migration stage of a seismic data analysis and are applicable to a seismic data collection system which has receivers located at various depths without incurring the problems and/or limitations associated with the prior attempts.

Figure 1:
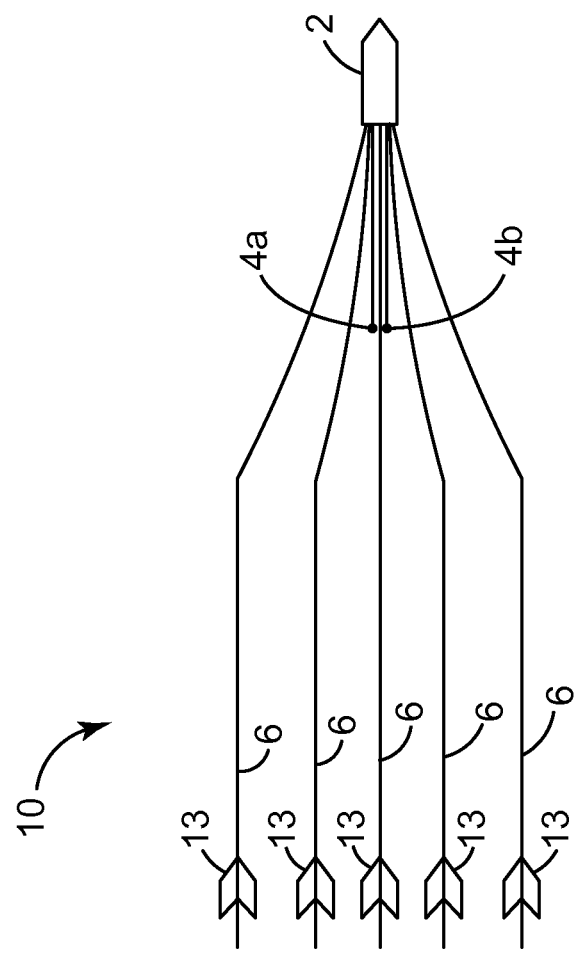
FIGS. 1 and 2 show various aspects of an exemplary marine seismic survey system in which various optimized receiver based ghost filter generation embodiments can be implemented.

In order to provide some context for the subsequent exemplary embodiments related to the collection of seismic data, the removal of receiver ghosts and the generation of seismic illumination maps, consider first a seismic data acquisition process and system as will now be described with respect to FIGS. 1 and 2. In FIG. 1, a data acquisition system 10 includes a ship 2 towing plural streamers 6 that may extend over kilometers behind ship 2. Each of the streamers 6 can include one or more birds 13 that maintains streamer 6 in a known fixed position relative to other streamers 6, and the birds 13 are capable of moving streamer 6 as desired according to bi-directional communications birds 13 can receive from ship 2. One or more source arrays 4a,b may be also towed by ship 2 or another ship for generating seismic waves. Source arrays 4a,b can be placed either in front of or behind receivers 14, or both behind and in front of receivers 14. The seismic waves generated by source arrays 4a,b propagate downward, reflect off of, and penetrate the seafloor, wherein the refracted waves eventually are reflected by one or more reflecting structures (not shown in FIG. 1) back to the surface (see FIG. 2, discussed below). The reflected seismic waves propagate upwardly and are detected by receivers 14 provided on streamers 6. The seismic waves then reflect off of the free surface, i.e., the surface of the body of water (see FIG. 2, discussed below), traveling downward and are once again detected by receivers 14 provided on streamers 6 as receiver ghosts. This process is generally referred to as "shooting" a particular seafloor area, with the seafloor area referred to as a "cell" and the sea surface referred to as a "free surface."

Figure 2:
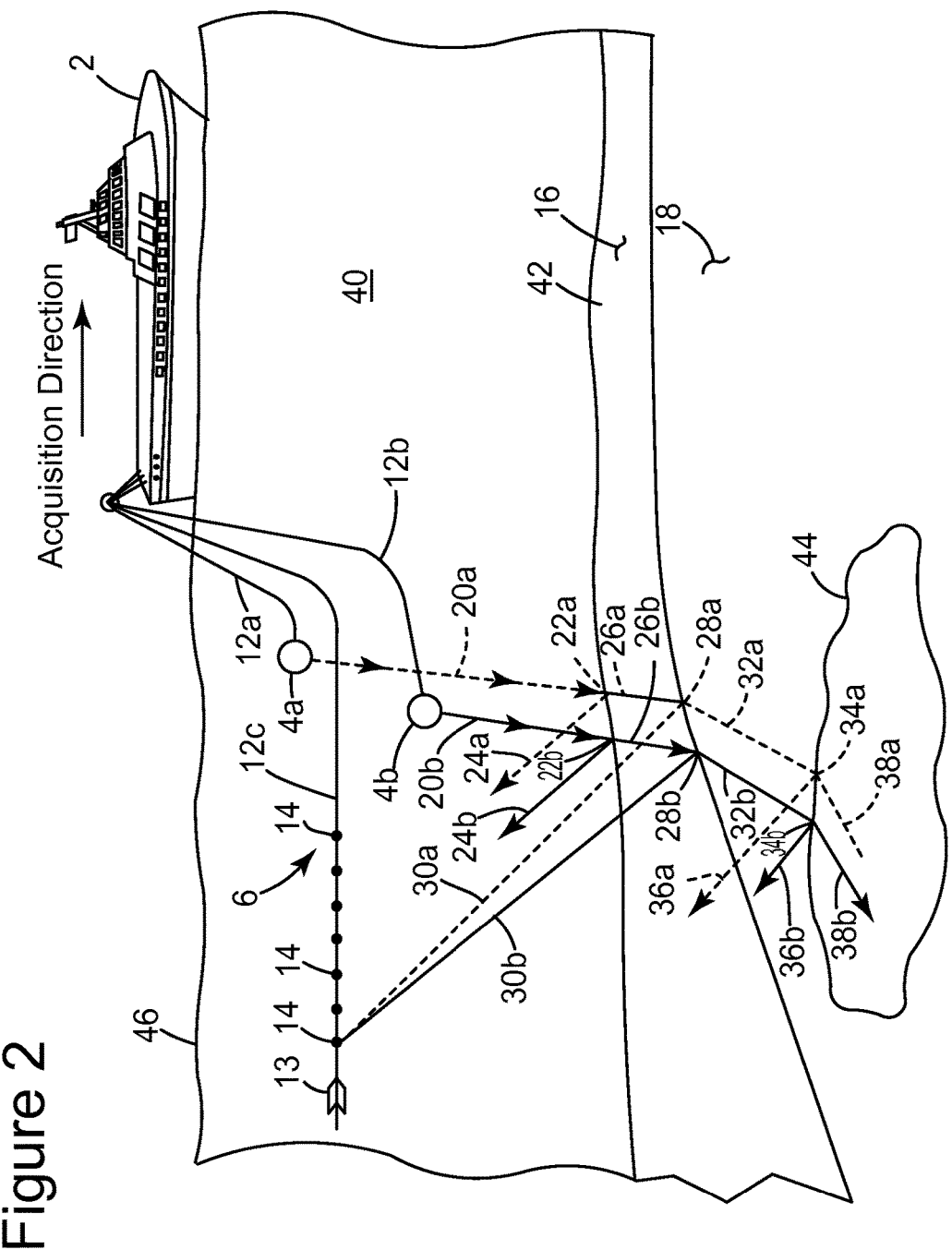

FIG. 2 illustrates a side view of the data acquisition system 10 of FIG. 1. Ship 2, located on ocean surface 46, tows one or more streamers 6, that is comprised of cables 12, and a plurality of receivers 14. Shown in FIG. 2 are two source streamers, which include sources 4a,b attached to respective cables 12a,b. Each source 4a,b is capable of transmitting a respective sound wave, or transmitted signal 20a,b. For the sake of simplifying the drawings, but while not detracting at all from an understanding of the many principles involved, only a first transmitted signal 20a will be shown (even though some or all of sources 4 can be simultaneously (or not) transmitting similar transmitted signals 20). First transmitted signal 20a travels through ocean 40 and arrives at first refraction/reflection point 22a. First reflected signal 24a from first transmitted signal 20a travels upward from ocean floor 42, back to receivers 14. As those of skill in the art can appreciate, whenever a signal—optical or acoustical—travels from one medium with a first index of refraction $n_1$ and meets with a different medium, with a second index of refraction $n_2$, a portion of the transmitted signal is reflected at an angle equal to the incident angle (according to the well-known Snell's law), and a second portion of the transmitted signal can be refracted (again according to Snell's law).

Thus, as shown in FIG. 2, first transmitted signal 20a generates first reflected signal 24a, and first refracted signal 26a. First refracted signal 26a travels through sediment layer 16 (which can be generically referred to as first subsurface layer 16) beneath ocean floor 42, and can now be considered to be a "new" transmitted signal, such that when it encounters a second medium at second refraction/reflection point 28a, a second set of refracted and reflected signals 32a and 30a, are subsequently generated. Further, as shown in FIG. 2, there happens to be a significant hydrocarbon deposit 44 within a third medium, or solid earth/rock layer 18 (which can be generically referred to as second subsurface layer 18). Consequently, refracted and reflected signals are generated by the hydrocarbon deposit, and it is the purpose of data acquisition system 10 to generate data that can be used to discover such hydrocarbon deposits 44.

The signals recorded by seismic receivers 14 vary in time, having energy peaks that may correspond to reflectors between layers. In reality, since the sea floor and the air/water are highly reflective, some of the peaks correspond to multiple reflections or spurious reflections that should be eliminated before the geophysical structure can be correctly imaged. Primary waves suffer only one reflection from an interface between layers of the subsurface (e.g., first reflected signal 24a). Waves other than primary waves are known as multiples. A surface multiple signal 50a shown in FIG. 2 is one such example of a multiple, however there are other ways for multiples to be generated. For example, reflections form the surface can travel back down to the receivers and be recorded as ghosts. Multiples do not add any useful information about the geology beneath the ocean floor, and thus they are, in essence, noise, and it is desirable to eliminate them and/or substantially reduce and/or eliminate their influence in signal processing of the other reflected signals so as to correctly ascertain the presence (or the absence) of underground/underwater hydrocarbon deposits. Similarly ghosts, i.e., reflections of primary waves or multiples from the surface of the water which are again recorded by receivers 14, should also be suppressed or removed.

The data collected and recorded by receivers 14 of FIG. 2 can be processed to, among other things, remove receiver ghosts and generate the types of illumination maps described above. This involves, among other things, in the Tau-P domain, the use of recorded data and mirror data, created from the recorded data, to jointly invert and create receiver ghost-free data. In a first aspect of the exemplary embodiment, mirror data is created from the recorded data. The creation of mirror data from recorded data can be accomplished by a mechanism such as, but not limited to, a one-dimensional ray-tracing based normal moveout correction technique. This technique approximately redatums the receiver ghost in the recorded data to the primary timing. It should be noted therefore that the primary in the recorded data becomes the mirror ghost which arrives earlier than the primary.

In a given time-space window, the recorded two-dimensional shot gather data $N(t, x_i)$ and its mirror data $M(t, x_i)$, with i=1, 2, . . . , n where n is the number of channels, are first transformed to the Tau-P domain and divided into different Tau-P windows. Next in the exemplary embodiment, the Tau-P windowed data is transformed to the f-p domain as $N(f,p_x^j)$ and $M(f,p_x^j)$ with j=1, 2, . . . , m and $p_x^j$ is the $j^{th}$ slowness in the x direction. Further in the exemplary embodiment, a deterministic deghosting filter can be applied to each slowness trace when slowness in the y direction $p_y$ is zero, e.g., in the two-dimensional case. Accordingly, the ghost-free data $P(f,p_x^j)$ can be defined as:

$$P(f, p_x^j) = N(f, p_x^j)\left(1 - e^{i4\pi fd\sqrt{v^{-2}-(p_x^j)^2}}\right)^{-1} \quad (1)$$

where "d" is the receiver depth and "V" is the water velocity. Considering a three-dimensional case, the problem becomes further complicated based on 1) $P_y$ may not be zero; and 2) $P_y$ may be different for different events with the same $p_x^j$. Addressing these issues in the exemplary embodiment requires inverting the ghost-delay times for a Tau-P window with a bootstrap approach rather than using a deterministic deghosting filter. In a first step of the exemplary embodiment, receiver ghost-free data $P(f,p_x^j)$ is determined through a least squares process as:

$$\begin{cases} N(f, p_x^j) = F_N P(f, p_x^j) \\ M(f, p_x^j) = F_M P(f, p_x^j) \end{cases}, \quad (2)$$

where $F_N$ is a ghost filter and $F_M$ is its dual. Using the primary $P_0(f,p_x^j)$ as a starting point, an iterative process is begun using equations (3)-(6). The first step of the iteration begins by obtaining a ghost with the equation:

$$G_k(f,p_x^j)=N(f,p_x^j)-P_k(f,p_x^j), \quad (3)$$

where "k" represents the "$k_{th}$" iteration. Continuing with the exemplary embodiment, the ghost delay time $T_j^k$ can be obtained by minimizing the equation:

$$O = \left| P_k(f, p_x^j) + G_k(f, p_x^j) e^{i2\pi f T_j^k} \right| \quad (4)$$

Accordingly, the optimal ghost filter can be expressed by the equation:

$$F_{k+1} = 1 - e^{-i2\pi f T_j^k} \quad (5)$$

and the primary is derived from the equation:

$$P_{k-1}(f,p_x^j)=F_{k+1}^{-1}N(f,p_x^j) \quad (6)$$

where $F_{k+1}$ is self-determined, i.e., bootstrapped, from the $k^{th}$ iteration. Continuing with the exemplary embodiment, after determining the ghost delay times, a least-squares inversion in the f-p domain is performed as described by the matrix:

$$\begin{pmatrix} N(f,x_1) \\ N(f,x_2) \\ \vdots \\ N(f,x_n) \end{pmatrix} = \quad (7)$$

$$\begin{pmatrix} (1-e^{i2\pi fT_1})e^{-i2\pi f\tau_1^1} & (1-e^{i2\pi fT_2})e^{-i2\pi f\tau_2^1} & \vdots & (1-e^{i2\pi fT_m})e^{-i2\pi f\tau_m^1} \\ (1-e^{i2\pi fT_1})e^{-i2\pi f\tau_1^2} & (1-e^{i2\pi fT_2})e^{-i2\pi f\tau_2^2} & \vdots & (1-e^{i2\pi fT_m})e^{-i2\pi f\tau_m^2} \\ \cdots & \cdots & & \cdots \\ (1-e^{i2\pi fT_1})e^{i2\pi f\tau_1^n} & (1-e^{i2\pi fT_2})e^{-i2\pi f\tau_2^n} & \vdots & (1-e^{i2\pi fT_m})e^{-i2\pi f\tau_m^n} \end{pmatrix}$$

$$\begin{pmatrix} P(f,p_x^1) \\ P(f,p_x^2) \\ \vdots \\ P(f,p_x^m) \end{pmatrix}$$

where $1-e^{i2\pi fT_j}$ is the ghost operator for the $j^{th}$ slowness, $e^{i2\pi fT_j i}$ is the inverse Tau-P transform operator for the $i^{th}$ channel and $j^{th}$ slowness, and $P(f,p_x^j)$ is the ghost free data. After inverting $P(f,p_x^j)$ with equation matrix 7, an inverse Tau-P transform is applied to obtain the ghost free data $P(f,x_i)$ with the equation matrix:

$$\begin{pmatrix} P(f,x_1) \\ P(f,x_2) \\ \vdots \\ P(f,x_n) \end{pmatrix} = \begin{pmatrix} e^{-i2\pi f\tau_1^1} & e^{-i2\pi f\tau_2^1} & \vdots & e^{-i2\pi f\tau_m^1} \\ e^{-i2\pi f\tau_1^2} & e^{-i2\pi f\tau_2^2} & \vdots & e^{-i2\pi f\tau_m^2} \\ \cdots & \cdots & & \cdots \\ e^{-i2\pi f\tau_1^n} & e^{-i2\pi f\tau_2^n} & \vdots & e^{-i2\pi f\tau_m^n} \end{pmatrix} \begin{pmatrix} P(f,p_x^1) \\ P(f,p_x^2) \\ \vdots \\ P(f,p_x^m) \end{pmatrix}, \quad (8)$$

allowing the final primary $P(t,x_i)$ to be obtained from an inverse Fourier transform.

Figure 3:
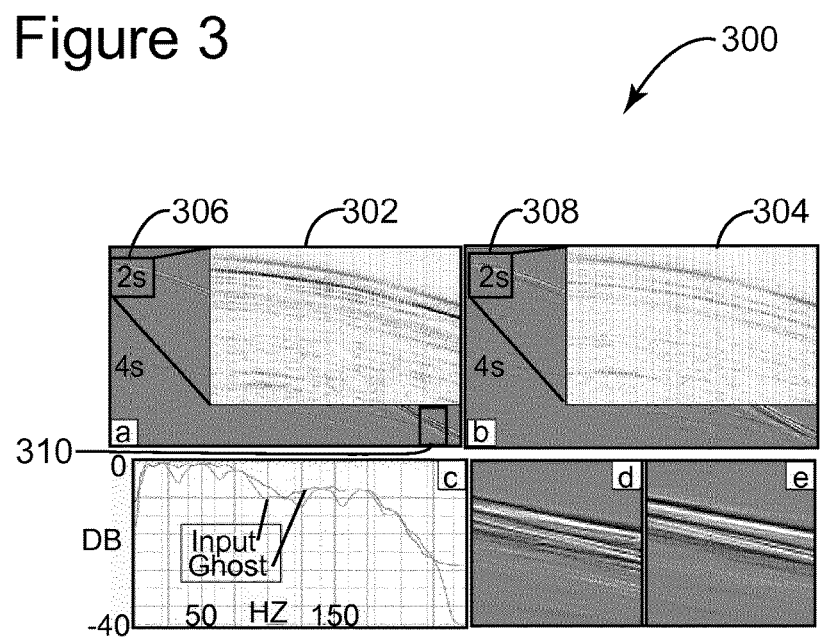
FIG. 3 shows various aspects of recorded, deghosted and spectral comparison data.
Figure 4:
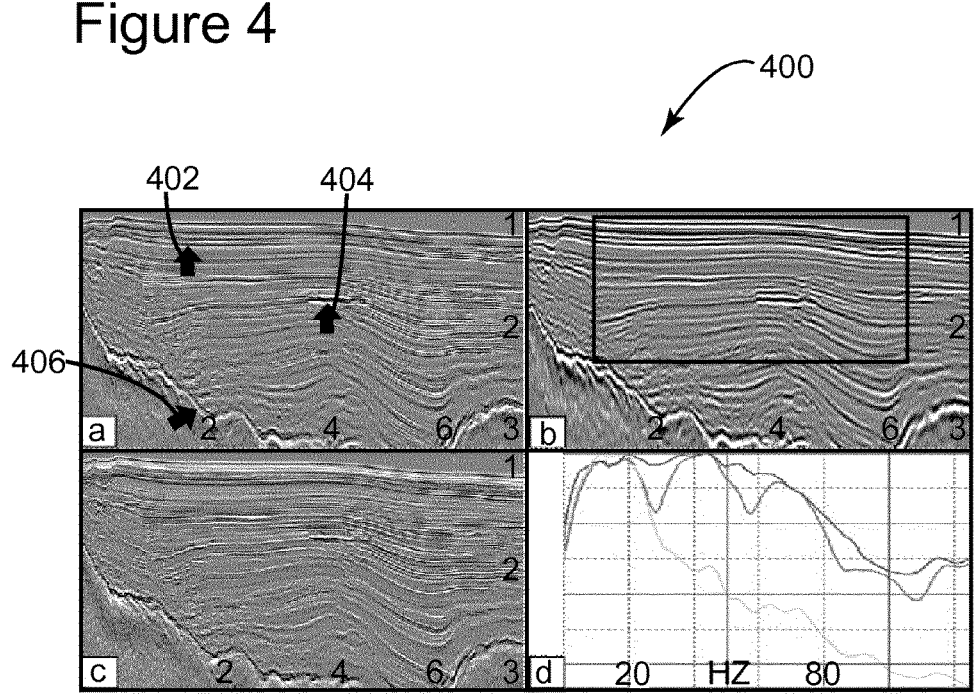
FIG. 4 shows various aspects of recorded, high-cut filtered, deghosted and spectral comparison data.

To illustrate the benefits of ghost removal using a ghost filter as described above, a Tau-P bootstrap algorithm is applied to a two-dimensional set of field data, from the Green Canyon area of the Gulf of Mexico, is depicted in FIGS. 3a-3e of FIG. 3, wherein the field data has a constant shot depth of eight meters and a constant streamer depth of 27 meters. Looking now to FIG. 3, the input shot gather is depicted in FIG. 3 and the input shot gather after deghosting is depicted in FIG. 3b. It should be noted in FIGS. 3a and 3b that the inset 302 is a zoom-in for a red box 306 in FIG. 3a and the inset 304 is a zoom-in for the red box 308 in FIG. 3b. It should further be noted that both primary and receiver ghost pairs are visible in FIG. 3a and that the receiver ghost is no longer visible in FIG. 3b. Looking now to FIG. 3c, a spectral comparison of input data and receiver deghosted data is depicted. It should be noted in FIG. 3c that the different orders of receiver-ghost notches are well filled-in. Looking now to FIGS. 3d and 3e, FIG. 3d depicts the results of a time-space domain bootstrap method compared to FIG. 3e and the exemplary embodiment Tau-P domain bootstrap method. It should be noted in the comparison that the exemplary embodiment indicates better performance in handling events with large variations of ghost-delay times at shallow large offsets when compared to the original input data, indicated by the blue box 310 in FIG. 3a Looking now to FIG. 4, FIG. 4a is a depiction of the stacked Kirchhoff prestack depth migration (PSDM) image of the input data without receiver deghosting. It should be noted in FIG. 4a that because of the large receiver depth, the primary events are well-separated from their corresponding receiver ghosts and exhibit an opposite polarity as indicated by the arrows 402, 404, 406, conditions that present difficulties in interpreting the data. Looking to FIG. 4b, general practice is depicted wherein high-cut filters are applied to the input data at the first receiver-ghost-notch frequency, e.g., twenty-seven Hertz, to mitigate the confusion between primary and ghost. Looking now to FIG. 4c, an image is depicted after application of the exemplary embodiment to the input data. It should be noted that the receiver ghost present in FIG. 4a is removed from FIG. 4c and the resulting image appears cleaner with higher resolution. Looking now to FIG. 4d, a chart reflecting a spectral comparison between the three images of FIGS. 4a-4c is depicted. It should be noted in FIG. 4d that the receiver-ghost notches present in the spectrum of the raw input are properly filled-in by the exemplary embodiment deghosting algorithm.

Presented above are self-sustaining, or bootstrap, deghosting embodiments that can effectively remove, in the premigration stage, the receiver ghost in data from a variety of marine towed streamer configurations. The advantages of the embodiment include but are not limited to 1) works for three-dimensional NAZ and WAZ geometries; and 2) no requirements for accurately-known receiver depths. The embodiments have successfully been applied to a deep-towed streamer dataset with a receiver depth of twenty-seven meters. Based on the receiver deghosting, the migrated images have a broader bandwidth and a higher signal-to-noise ratio, which can be beneficial for the interpretation of geological structures and rock properties.

Although the embodiments use two datasets, one of the datasets is created as mirror data from the recorded data and the embodiments are applicable to all streamer data without the additional acquisition expense. Further, the embodiments do not require normalization between the two datasets prior to deghosting because both datasets are recorded by the same sensor.

Figure 5:
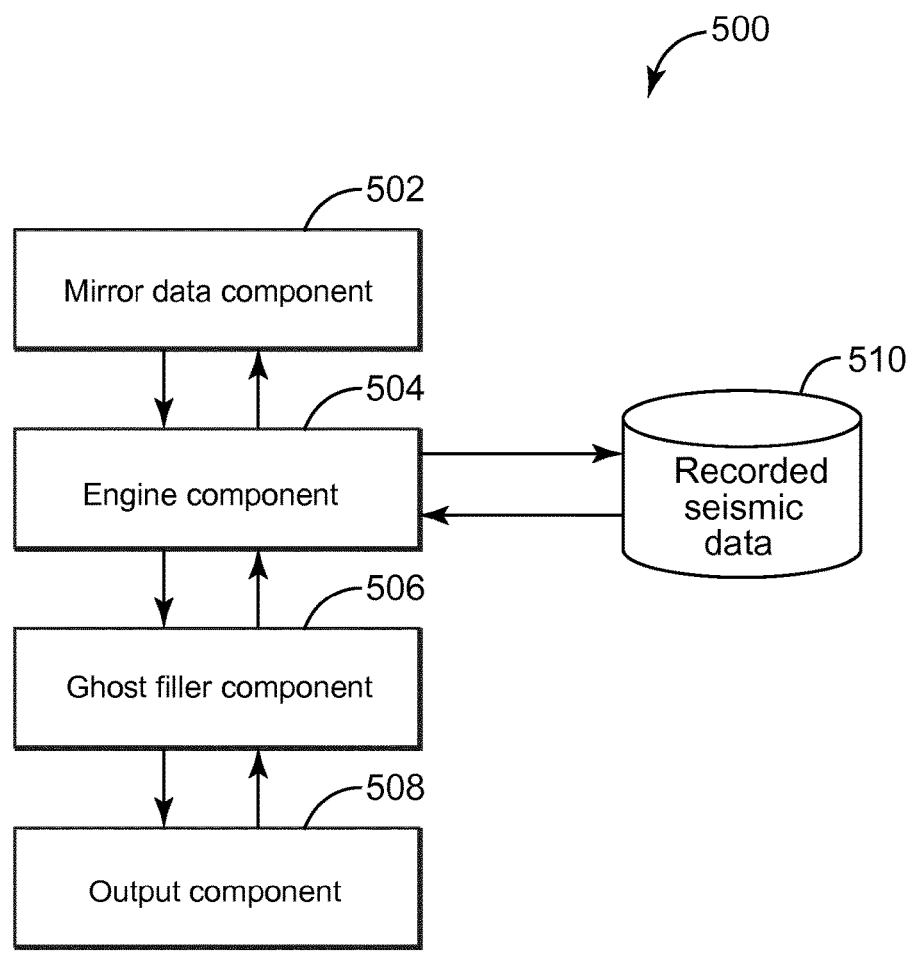
FIGS. 5-7 show various aspects of software components or modules which can be used to implement the embodiments.

As will be appreciated from the foregoing discussion, methods for generating optimized ghost filters and deghosted seismic data according to these embodiments may, at least in part, be implemented in software operating on a suitably programmed computing device. An exemplary implementation, with suitable software modules or components, will now be described with respect to FIGS. 5-7. Looking now to FIG. 5, an exemplary embodiment premigration deghosting node 500 comprises a mirror data component 502, an engine component 504, a ghost filter component 506, an output component 508 and recorded seismic data 510. The mirror data component 502 provides the capability to generate the mirror data based on the recorded seismic data 510. The mirror data is generated by using a one-dimensional ray tracing based moveout correction. It should be noted in the exemplary embodiment that this process approximately redatums the receiver ghost in the recorded data to the primary data timing, i.e., the primary in the recorded data becomes the mirror ghost which arrives earlier than the primary.

Continuing with the exemplary embodiment, the engine component 504 provides the capability to transform the recorded data and the mirror data from a time-space (T-X) domain to a Tau-P (tau-p) domain. In another aspect, the engine component 504 generates a phase coefficient to correct for time differences between the transformed recorded data and the transformed mirror data. Continuing with the exemplary embodiment, the engine component 504 provides the capability to compute the frequency-slowness (f-p) domain primaries associated with the recorded data based on reghosted and inverse transformed f-p domain primaries equaling the input data. Next in the exemplary embodiment, the engine component 504 provides the capability to generate the frequency-space (f-x) primaries based on an inverse Tau-P transform of the previously determined f-p primaries. The ghost free time-space primaries can then be generated based on an inverse Fourier transform of the f-x primaries.

Next in the exemplary embodiment, the ghost filter component 506 provides the capability to generate a ghost filter based on predicting an initial ghost filter and optimizing the initial ghost filter by minimizing the ghost filter delay time associated with the transformed recorded data. Next in the exemplary embodiment, the output component 508 provides the capability to apply the optimized ghost filter to the transformed recorded data and output ghost-free receiver based seismic data.

Figure 6:
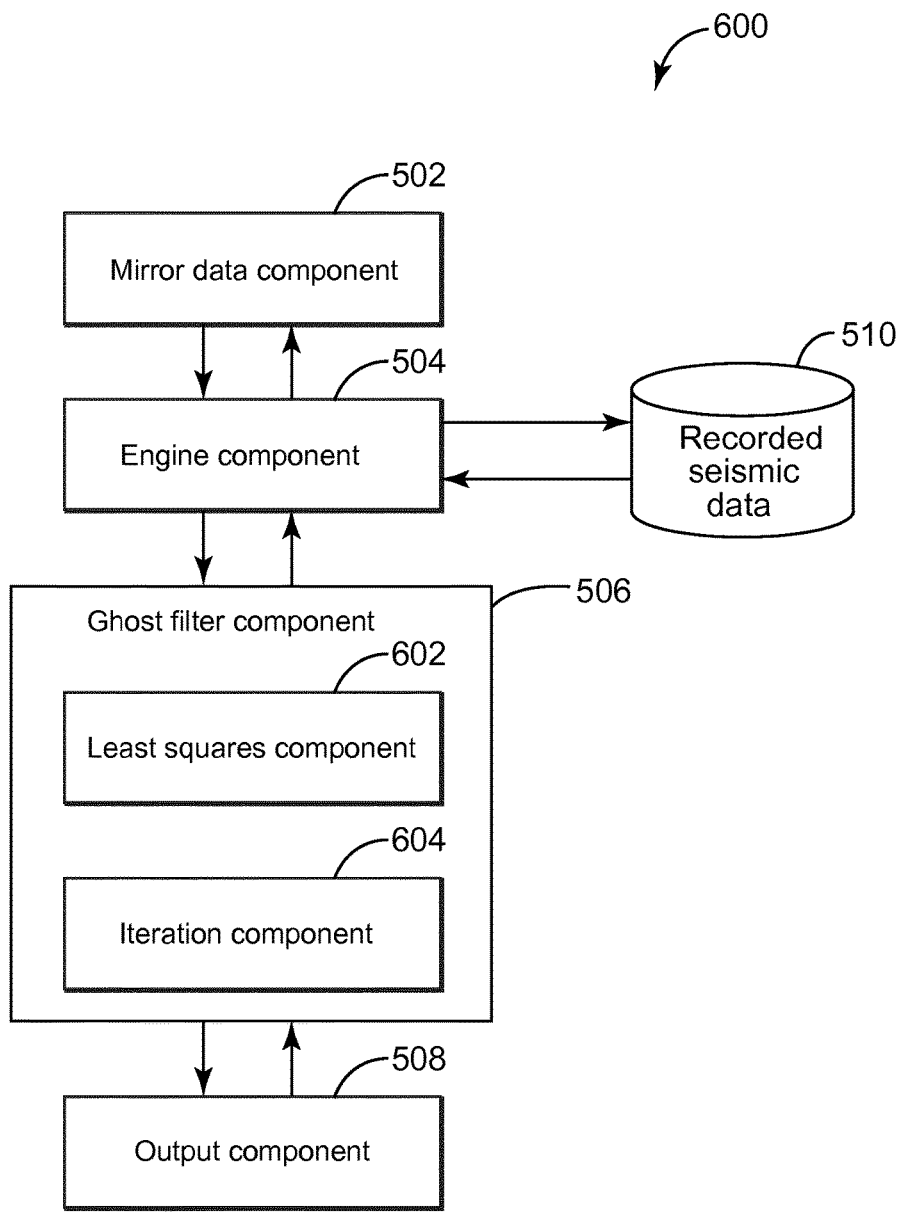

Looking now to FIG. 6, an exemplary embodiment premigration deghosting node 600 comprises a mirror data component 502, an engine component 504, a ghost filter component 506 wherein the ghost filter component 506 further comprises a least squares component 602 and an iteration component 604, an output component 508 and recorded seismic data 510. The least squares component 602 provides the ability to predict the initial ghost filter based on a least squares process and the iteration component 604 provides the capability to optimize the predicted ghost filter by iterating through the transformed recorded data and minimizing a ghost delay time based on a difference between ghost filters associated with the different iterations.

Figure 7:
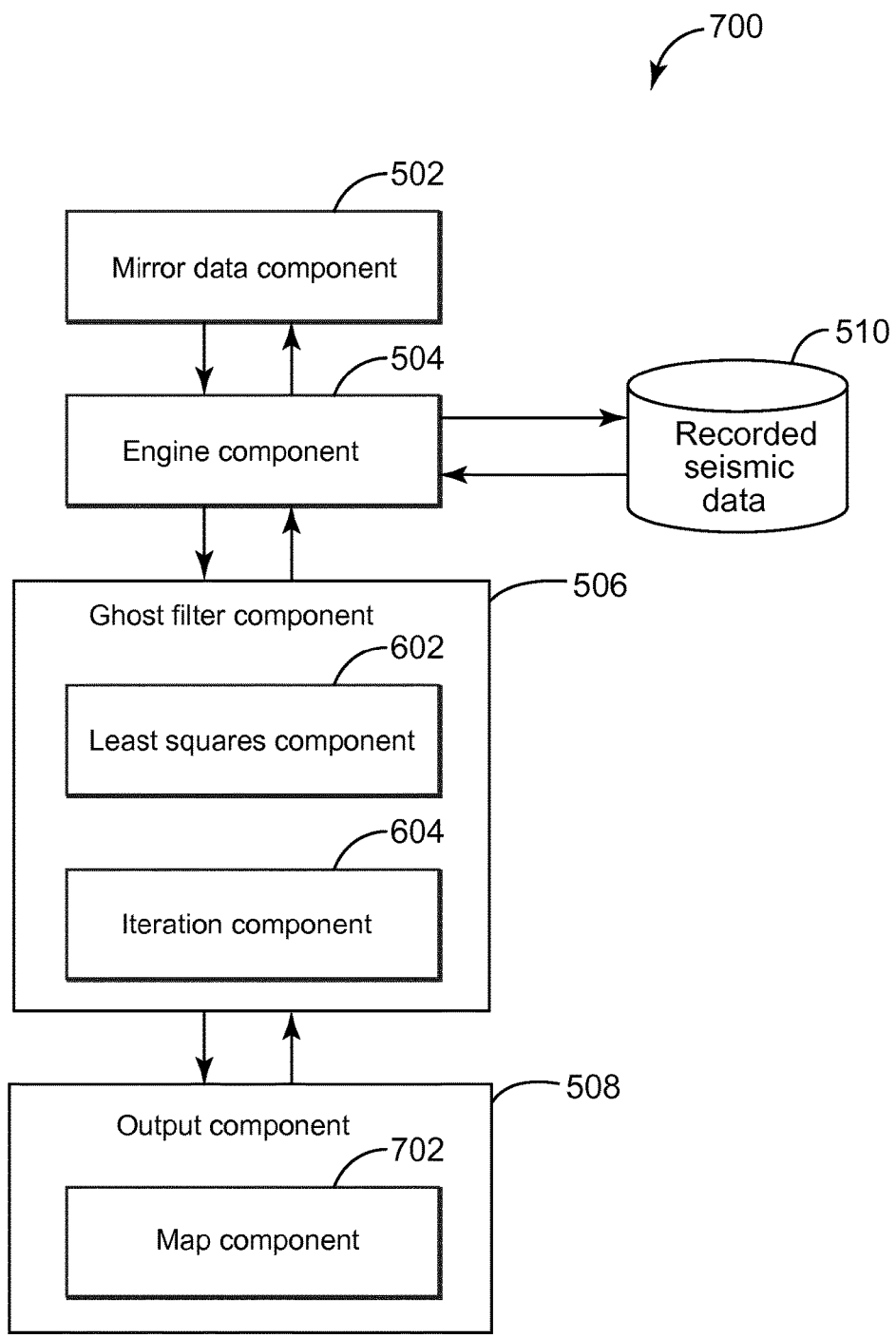

Looking now to FIG. 7, an exemplary embodiment premigration deghosting node 700 comprises a mirror data component 502, an engine component 504, a ghost filter component 506 wherein the ghost filter component 506 further comprises a least squares component 602 and an iteration component 604, an output component 508 wherein the output component further comprises a map component 702 and recorded seismic data 510. The map component 702 provides the capability to generate a map of seismic illumination based on the ghost-free receiver-based seismic data generated by applying the optimized ghost filter to the transformed recorded data.

Figure 8:
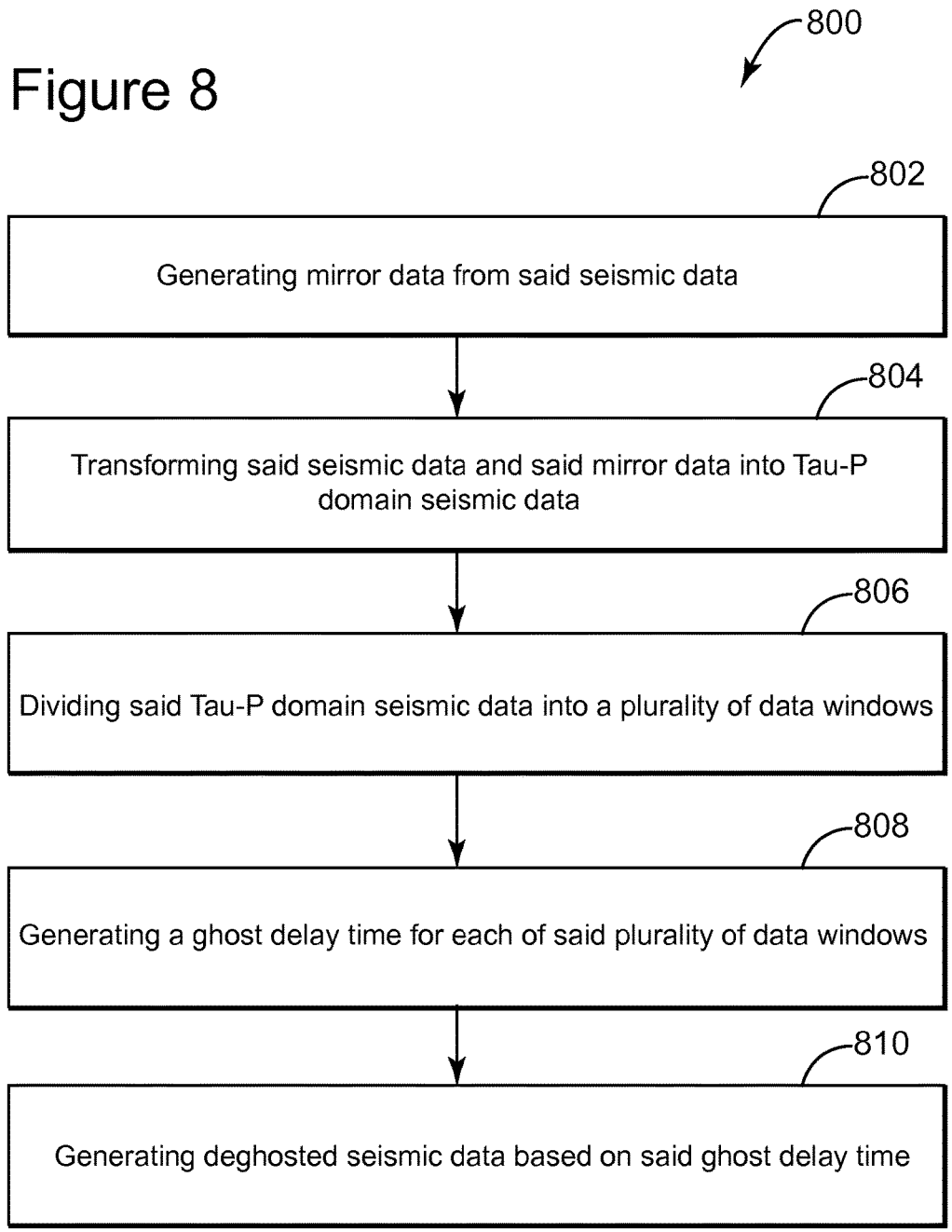
FIG. 8 is a flowchart depicting a method of optimized receiver-based ghost filter generation according to another embodiment.

Looking now to FIG. 8, an exemplary method embodiment of an optimized receiver-based ghost filter generation technique 800 is depicted. Starting at step 802 of the exemplary method embodiment, mirror data is generated based on recorded seismic data. In one aspect of the exemplary method embodiment step 802, the mirror data is generated during a premigration stage. It should be noted that exemplary step 802 can include a one-dimensional ray-tracing technique for generating the mirror data. It should further be noted that the mirror data generation can be associated with a moveout correction.

Next, at step 804 of the exemplary method embodiment, the recorded seismic data and the mirror data are transformed to Tau-P domain seismic data. Continuing at step 806 of the method embodiment, the Tau-P domain seismic data is divided into a plurality of data windows. Next at step 808 of the exemplary method embodiment, a ghost delay time for each of the plurality of data windows is generated. Continuing at step 810 of the exemplary embodiment, deghosted seismic data is generated based on the ghost delay time.

Figure 9:
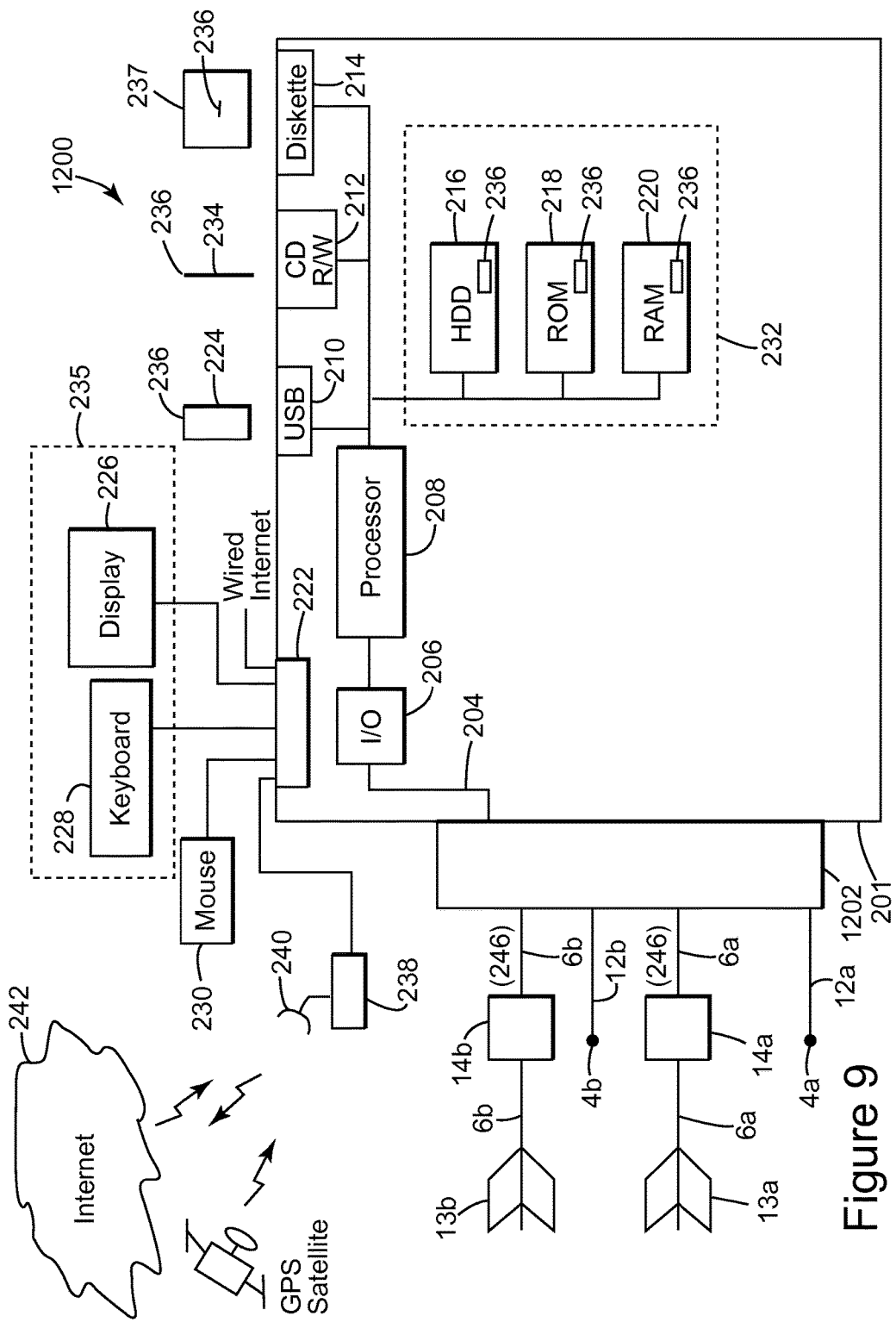
FIG. 9 illustrates an exemplary data processing device or system which can be used to implement the embodiments.

The computing device(s) or other network nodes involved in optimized receiver-based ghost filter generation as set forth in the above described embodiments may be any type of computing device capable of processing and communicating seismic data associated with a seismic survey. An example of a representative computing system capable of carrying out operations in accordance with these embodiments is illustrated in FIG. 9. System 1200 includes, among other items, server 201, source/receiver interface 1202, internal data/communications bus (bus) 204, processor(s) 208 (those of ordinary skill in the art can appreciate that in modern server systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application), universal serial bus (USB) port 210, compact disk (CD)/digital video disk (DVD) read/write (R/W) drive 212, floppy diskette drive 214 (though less used currently, many servers still include this device), and data storage unit 232.

Data storage unit 232 itself can comprise hard disk drive (HDD) 216 (these can include conventional magnetic storage media, but, as is becoming increasingly more prevalent, can include flash drive-type mass storage devices 224, among other types), ROM device(s) 218 (these can include electrically erasable (EE) programmable ROM (EEPROM) devices, ultra-violet erasable PROM devices (UVPROMs), among other types), and random access memory (RAM) devices 220. Usable with USB port 210 is flash drive device 224, and usable with CD/DVD R/W device 212 are CD/DVD disks 234 (which can be both read and write-able). Usable with diskette drive device 214 are floppy diskettes 237. Each of the memory storage devices, or the memory storage media (216, 218, 220, 224, 234, and 237, among other types), can contain parts or components, or in its entirety, executable software programming code (software) 236 that can implement part or all of the portions of the method described herein. Further, processor 208 itself can contain one or different types of memory storage devices (most probably, but not in a limiting manner, RAM memory storage media 220) that can store all or some of the components of software 236.

In addition to the above described components, system 200 also comprises user console 234, which can include keyboard 228, display 226, and mouse 230. All of these components are known to those of ordinary skill in the art, and this description includes all known and future variants of these types of devices. Display 226 can be any type of known display or presentation screen, such as liquid crystal displays (LCDs), light emitting diode displays (LEDs), plasma displays, cathode ray tubes (CRTs), among others. User console 235 can include one or more user interface mechanisms such as a mouse, keyboard, microphone, touch pad, touch screen, voice-recognition system, among other inter-active inter-communicative devices.

User console 234, and its components if separately provided, interface with server 201 via server input/output (I/O) interface 222, which can be an RS232, Ethernet, USB or other type of communications port, or can include all or some of these, and further includes any other type of communications means, presently known or further developed. System 200 can further include communications satellite/global positioning system (GPS) transceiver device 238, to which is electrically connected at least one antenna 240 (according to an exemplary embodiment, there would be at least one GPS receive-only antenna, and at least one separate satellite bi-directional communications antenna). System 200 can access internet 242, either through a hard wired connection, via I/O interface 222 directly, or wirelessly via antenna 240, and transceiver 238.

Server 201 can be coupled to other computing devices, such as those that operate or control the equipment of ship 2, via one or more networks. Server 201 may be part of a larger network configuration as in a global area network (GAN) (e.g., internet 242), which ultimately allows connection to various landlines.

According to a further exemplary embodiment, system 200, being designed for use in seismic exploration, will interface with one or more sources 4*a,b* and one or more receivers 14. These, as previously described, are attached to streamers 6*a,b*, to which are also attached birds 13*a,b* that are useful to maintain positioning. As further previously discussed, sources 4 and receivers 14 can communicate with server 201 either through an electrical cable that is part of streamer 6, or via a wireless system that can communicate via antenna 240 and transceiver 238 (collectively described as communications conduit 246).

According to further exemplary embodiments, user console 235 provides a means for personnel to enter commands and configuration into system 200 (e.g., via a keyboard, buttons, switches, touch screen and/or joy stick). Display device 226 can be used to show: streamer 6 position; visual representations of acquired data; source 4 and receiver 14 status information; survey information; and other information important to the seismic data acquisition process. Source and receiver interface unit 202 can receive the hydrophone seismic data from receiver 14 though streamer communication conduit 248 (discussed above) that can be part of streamer 6, as well as streamer 6 position information from birds 13; the link is bi-directional so that commands can also be sent to birds 13 to maintain proper streamer positioning. Source and receiver interface unit 202 can also communicate bi-directionally with sources 4 through the streamer communication conduit 248 that can be part of streamer 6. Excitation signals, control signals, output signals and status information related to source 4 can be exchanged by streamer communication conduit 248 between system 200 and source 4.

Bus 204 allows a data pathway for items such as: the transfer and storage of data that originate from either the source sensors or streamer receivers; for processor 208 to access stored data contained in data storage unit memory 232; for processor 208 to send information for visual display to display 226; or for the user to send commands to system operating programs/software 236 that might reside in either the processor 208 or the source and receiver interface unit 202.

System 200 can be used to implement the methods described above associated with optimized receiver-based ghost filter generation according to an exemplary embodiment. Hardware, firmware, software or a combination thereof may be used to perform the various steps and operations described herein. According to an exemplary embodiment, software 236 for carrying out the above discussed steps can be stored and distributed on multi-media storage devices such as devices 216, 218, 220, 224, 234, and/or 237 (described above) or other form of media capable of portably storing information (e.g., universal serial bus (USB) flash drive 426). These storage media may be inserted into, and read by, devices such as the CD-ROM drive 414, the disk drive 412, among other types of software storage devices.

It should be noted in the embodiments described herein that these techniques can be applied in either an "offline", e.g., at a land-based data processing center or an "online" manner, i.e., in near real time while onboard the seismic vessel. For example, optimized receiver-based ghost filter generation can occur as the seismic data is recorded onboard the seismic vessel. In this case, it is possible for receiver-based ghost-free data to be generated as a measure of the quality of the sampling run.

The disclosed exemplary embodiments provide a server node, and a method for generating an optimized receiver-based ghost filter associated with seismic data. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for seismic exploration, said method comprising:
    obtaining seismic data recorded by receivers towed underwater that detect seismic excitations emerging from a geophysical formation under a seafloor;
    generating mirror data from said seismic data;
    transforming said seismic data and said mirror data into Tau-P domain seismic data;
    dividing said Tau-P domain seismic data into a plurality of data windows;
    generating a ghost delay time for each of said plurality of data windows;
    generating deghosted seismic data based on said ghost delay time, so as said deghosted seismic data with a spectra substantially free of frequency depletions occurring in said seismic data due to receiver-side ghosts;
    generating an image of the geophysical formation based on the deghosted seismic data, the image showing geological structures to evaluate presence and location of oil and/or gas reservoirs.

2. The method of claim 1, wherein said generating mirror data is based on a one-dimensional ray-tracing technique.

3. The method of claim 2, wherein said one-dimensional ray tracing technique is associated with a moveout correction.

4. The method of claim 1, wherein said ghost delay time is based on receiver depth, water velocity and slowness.

5. The method of claim 4, wherein a y-component of said slowness is zero.

6. The method of claim 4, wherein f-p domain primaries associated with said slowness are inverted by a least squares technique.

7. The method of claim 1, wherein associated events of said plurality of data windows have a similar ghost delay time.

8. The method of claim 7, wherein said similar ghost delay time is less than an inverse of four times the maximum frequency of said seismic data.

9. The method of claim 1, wherein said seismic data has a constant depth profile.

10. The method of claim 1, wherein said seismic data has a variable depth profile.

11. The method of claim 1, wherein said seismic data is two-dimensional data.

12. The method of claim 1, wherein said seismic data is three-dimensional data.

13. The method of claim 6, wherein a reghosting operator associated with said f-p domain primaries is defined as $1-e^{i2\pi fT_j}$ for a $j^{th}$ slowness.

14. The method of claim 6, wherein an inverse Tau-P transform operator associated with said f-p domain primaries is defined as $e^{-i2\pi f\tau_j^i}$ for an $i^{th}$ channel and a $j^{th}$ slowness.

15. The method of claim 1, wherein timing differences associated with said generating a ghost delay time are based on receiver depth inaccuracy.

16. A system for seismic exploration, said system comprising:
receivers configured to record seismic data representative for reflections and refractions of seismic waves in a geophysical formation under a seafloor;
one or more processors configured to execute computer instructions and a memory configured to store said computer instructions wherein said computer instructions further comprise:
a mirror data component for generating mirror data of said recorded data;
an engine component for transforming said recorded data and said mirror data from a time-space domain to a Tau-P domain, from a Tau-P domain to a frequency-slowness domain, from a frequency-slowness domain to time-space domain and for adding a phase coefficient to correct for time differences between transformed recorded data and transformed mirror data;
a ghost filter component for generating a ghost filter based on predicting an initial ghost filter and optimizing said initial ghost filter based on minimizing a ghost filter delay time associated with said transformed recorded data; and
an output component for outputting said ghost-free receiver-based seismic data, so as said deghosted seismic data with a spectra substantially free of frequency depletions occurring in said seismic data due to receiver-side ghosts,
wherein the one or more processors are further configured to generate an image of the geophysical formation based on the deghosted seismic data and showing geological structures to evaluate presence and location of oil and/or gas reservoirs.

17. The system of claim 16, wherein said ghost filter component further comprises a least squares component for predicting said initial ghost filter.

18. The system of claim 17, wherein said ghost filter component further comprises an iteration component for iterating through said transformed recorded data and minimizing a ghost delay time based on a difference between a ghost filter associated with different iterations.

19. The system of claim 18, wherein said different iterations comprise a current iteration and a previous iteration and said current iteration and said previous iteration are sequential.

20. The system of claim 16, wherein said output component further comprises a map component for generating a map of seismic illumination based on said ghost-free receiver-based seismic data.

* * * * *